United States Patent
Peterson et al.

[11] Patent Number: 5,934,304
[45] Date of Patent: Aug. 10, 1999

[54] APPARATUS AND METHOD FOR GAS METER BYPASS

[76] Inventors: Michael H. Peterson, 10588 Leilani Dr., Sandy, Utah 84070; Joe Palmer, 104 S. Robinson Rd., Nampa, Id. 83687

[21] Appl. No.: 09/060,405

[22] Filed: Apr. 13, 1998

[51] Int. Cl.[6] .................................................. F16K 43/00
[52] U.S. Cl. .......................... 137/15; 73/201; 137/315; 137/317; 137/319; 138/97; 285/18; 285/30
[58] Field of Search ................................ 73/201; 137/15, 137/315, 320, 317, 319; 138/92, 94, 94.3, 97; 285/30

[56] References Cited

U.S. PATENT DOCUMENTS

| | | | |
|---|---|---|---|
| 2,579,656 | 12/1951 | Douglas | 73/201 |
| 3,032,069 | 5/1962 | Fickllin | 137/315 |
| 3,148,690 | 9/1964 | Petersen | 137/15 |
| 3,187,570 | 6/1965 | Mueller | 73/201 |
| 3,245,257 | 4/1966 | Anderson | 73/201 |
| 3,256,735 | 6/1966 | Smith | 73/201 |
| 3,266,308 | 8/1966 | Howarth | 73/201 |
| 3,272,009 | 9/1966 | Leopold, Jr. et al. | 73/201 |
| 3,296,861 | 1/1967 | Mueller | 73/201 |
| 3,301,051 | 1/1967 | Smith | 73/201 |
| 3,382,888 | 5/1968 | Mueller et al. | 73/201 |
| 3,444,724 | 5/1969 | Gilpin | 73/40.5 |
| 5,042,528 | 8/1991 | England | 137/605 |
| 5,099,868 | 3/1992 | Weber | 137/315 |
| 5,178,188 | 1/1993 | Russell | 137/606 |
| 5,287,886 | 2/1994 | Russell | 137/606 |
| 5,437,300 | 8/1995 | Winnie | 137/112 |
| 5,472,011 | 12/1995 | St. Marie | 137/315 |
| 5,482,073 | 1/1996 | Winnie | 137/15 |
| 5,501,331 | 3/1996 | Lyall | 206/223 |

FOREIGN PATENT DOCUMENTS 3803813  8/1989  Germany .................. 137/315

*Primary Examiner*—George L. Walton
*Attorney, Agent, or Firm*—J. David Nelson

[57] ABSTRACT

A gas meter bypass apparatus and method for removing a gas meter from operation for service or replacement and placing the meter back into service without interrupting the flow of gas to the user. The apparatus connects to a standard tee which is utilized on the customer side of most residential or commercial meter installations. The bypass apparatus includes a clamp assembly, a seal fitting, an isolation valve, an extraction fitting, an isolation fitting, and a flexible tube connector. The clamp assembly is used to attach the bypass apparatus to the tee. The seal fitting connects to the clamp assembly and seals between the bypass apparatus and the port of the tee where the plug is installed. The isolation valve attaches to the seal fitting. The extraction fitting attaches to the isolation valve and is used to extract and re-install the plug through the isolation valve. The isolation fitting also attaches to the isolation valve and is used to supply gas from an alternate source to the tee outlet and to seal off the flow of gas from the meter. The isolation valve is closed for switching between the extraction fitting and the isolation fitting and open for extraction and re-insertion of the plug and for extension and retraction of the isolation rod which stops the meter flow and supplies the alternate source gas to the tee outlet.

24 Claims, 18 Drawing Sheets

Legend
1 Discharge Piping
2 Meter
3 Tee
4 Bypass Apparatus
5 Clamp Assembly
78 Shut-off Valve
79 Pressure Reducing Valve
80 In-flow Piping
83 Meter Outlet
87 Inlet Meter Nut
88 Outlet Meter Nut
97 Service Line to User Legend
1  Discharge Piping
2  Meter
3  Tee
4  Bypass Apparatus
5  Clamp Assembly
78 Shut-off Valve
79 Pressure Reducing Valve
80 In-flow Piping
83 Meter Outlet
87 Inlet Meter Nut
88 Outlet Meter Nut
97 Service Line to User

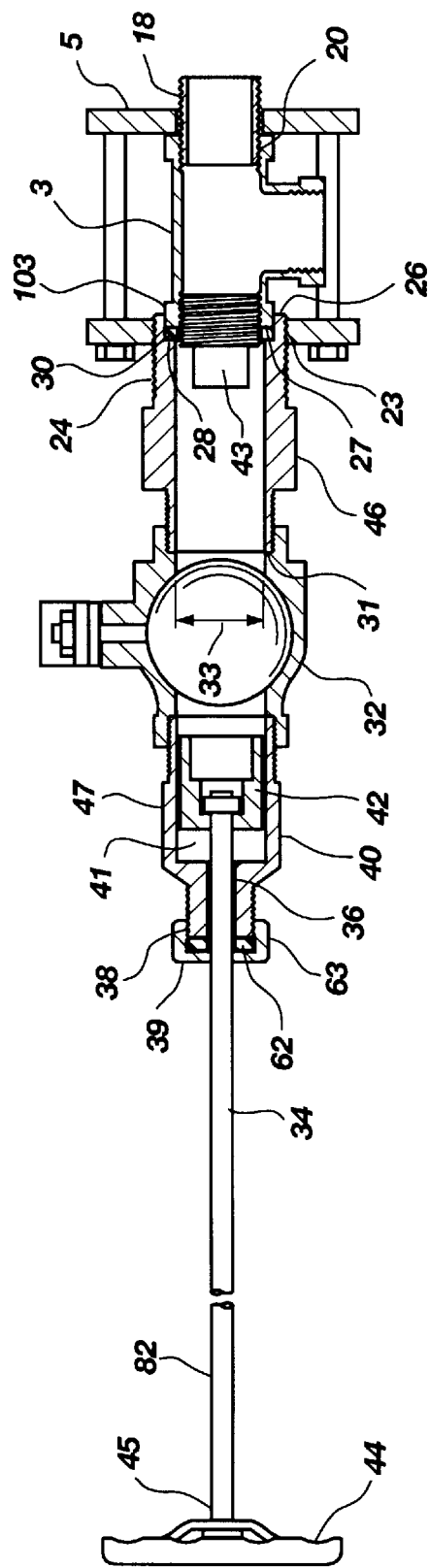

Fig. 3A

Legend

| | |
|---|---|
| 3 | Tee |
| 5 | Clamp Assembly |
| 18 | Rear Port Pipe |
| 20 | Rear end Port of Tee |
| 23 | Threaded Front Clamp Plate Opening |
| 24 | Seal Fitting |
| 26 | Rear End of Seal Fitting |
| 27 | Front end of Tee |
| 28 | Seal Collar |
| 30 | Seal Collar Gasket |
| 31 | Front End of Seal Fitting |
| 32 | Isolation Valve |
| 33 | Isolation Valve Clear Opening |
| 34 | Plug Extraction Rod |
| 36 | Extraction Rod Shaft Way |
| 38 | Front End of Extraction Fitting |
| 39 | Extractor Cap |
| 40 | Extraction Fitting |
| 41 | Extraction Cavity |
| 42 | Plug Extractor |
| 43 | Plug |
| 44 | Extraction Rod Handle |
| 45 | Front End of Extraction Rod |
| 46 | Hand Grip for Seal Fitting |
| 47 | Hand Grip for Extraction Fitting |
| 62 | Extractor Cap Seal Gasket |
| 63 | Hand Grip for Extractor Cap |
| 82 | Extraction Rod Shaft |
| 103 | Front End Port of Tee |

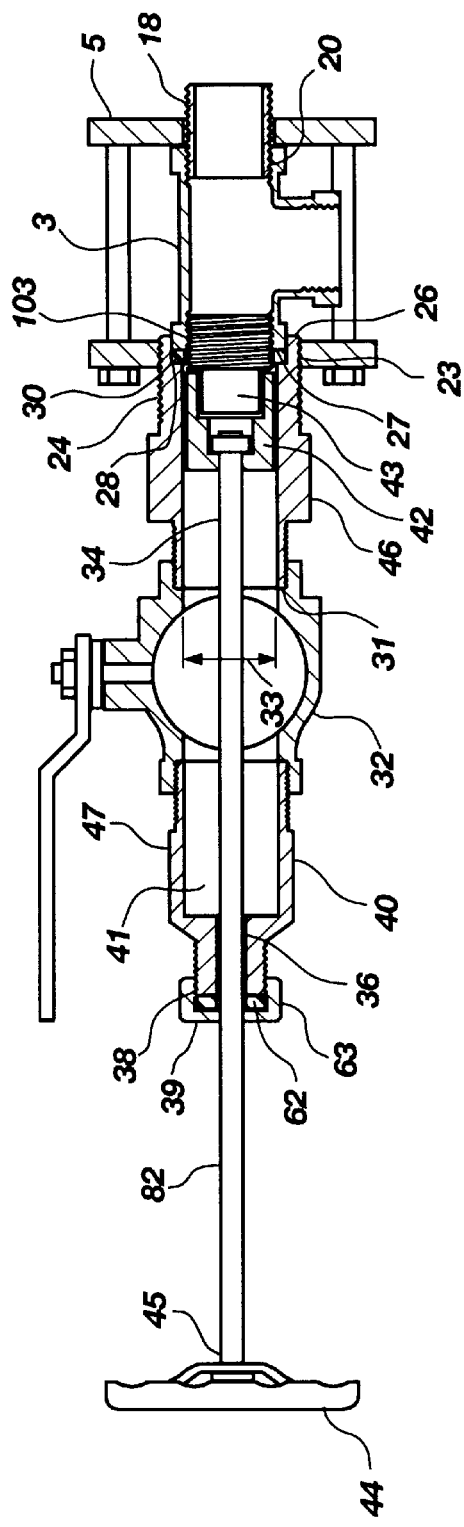

Fig. 3B

Legend

| | |
|---|---|
| 3 | Tee |
| 5 | Clamp Assembly |
| 18 | Rear Port Pipe |
| 20 | Rear end Port of Tee |
| 23 | Threaded Front Clamp Plate Opening |
| 24 | Seal Fitting |
| 26 | Rear End of Seal Fitting |
| 27 | Front end of Tee |
| 28 | Seal Collar |
| 30 | Seal Collar Gasket |
| 31 | Front End of Seal Fitting |
| 32 | Isolation Valve |
| 33 | Isolation Valve Clear Opening |
| 34 | Plug Extraction Rod |
| 36 | Extraction Rod Shaft Way |
| 38 | Front End of Extraction Fitting |
| 39 | Extractor Cap |
| 40 | Extraction Fitting |
| 41 | Extraction Cavity |
| 42 | Plug Extractor |
| 43 | Plug |
| 44 | Extraction Rod Handle |
| 45 | Front End of Extraction Rod |
| 46 | Hand Grip for Seal Fitting |
| 47 | Hand Grip for Extraction Fitting |
| 62 | Extractor Cap Seal Gasket |
| 63 | Hand Grip for Extractor Cap |
| 82 | Extraction Rod Shaft |
| 103 | Front End Port of Tee |

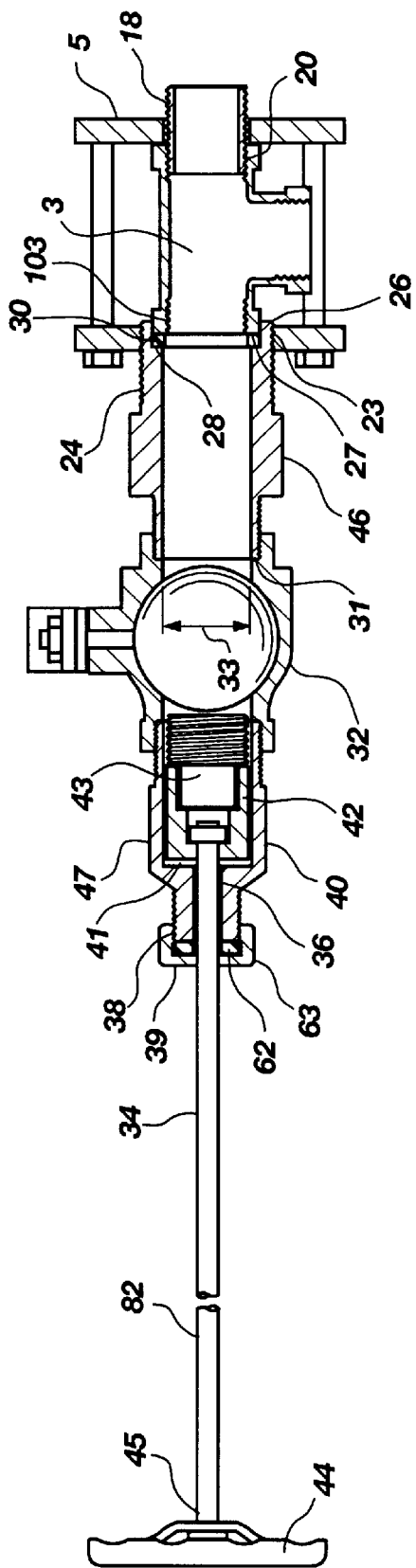

Fig. 3C

Legend

| | |
|---|---|
| 3 | Tee |
| 5 | Clamp Assembly |
| 18 | Rear Port Pipe |
| 20 | Rear end Port of Tee |
| 23 | Threaded Front Clamp Plate Opening |
| 24 | Seal Fitting |
| 26 | Rear End of Seal Fitting |
| 27 | Front end of Tee |
| 28 | Seal Collar |
| 30 | Seal Collar Gasket |
| 31 | Front End of Seal Fitting |
| 32 | Isolation Valve |
| 33 | Isolation Valve Clear Opening |
| 34 | Plug Extraction Rod |
| 36 | Extraction Rod Shaft Way |
| 38 | Front End of Extraction Fitting |
| 39 | Extractor Cap |
| 40 | Extraction Fitting |
| 41 | Extraction Cavity |
| 42 | Plug Extractor |
| 43 | Plug |
| 44 | Extraction Rod Handle |
| 45 | Front End of Extraction Rod |
| 46 | Hand Grip for Seal Fitting |
| 47 | Hand Grip for Extraction Fitting |
| 62 | Extractor Cap Seal Gasket |
| 63 | Hand Grip for Extractor Cap |
| 82 | Extraction Rod Shaft |
| 103 | Front End Port of Tee |

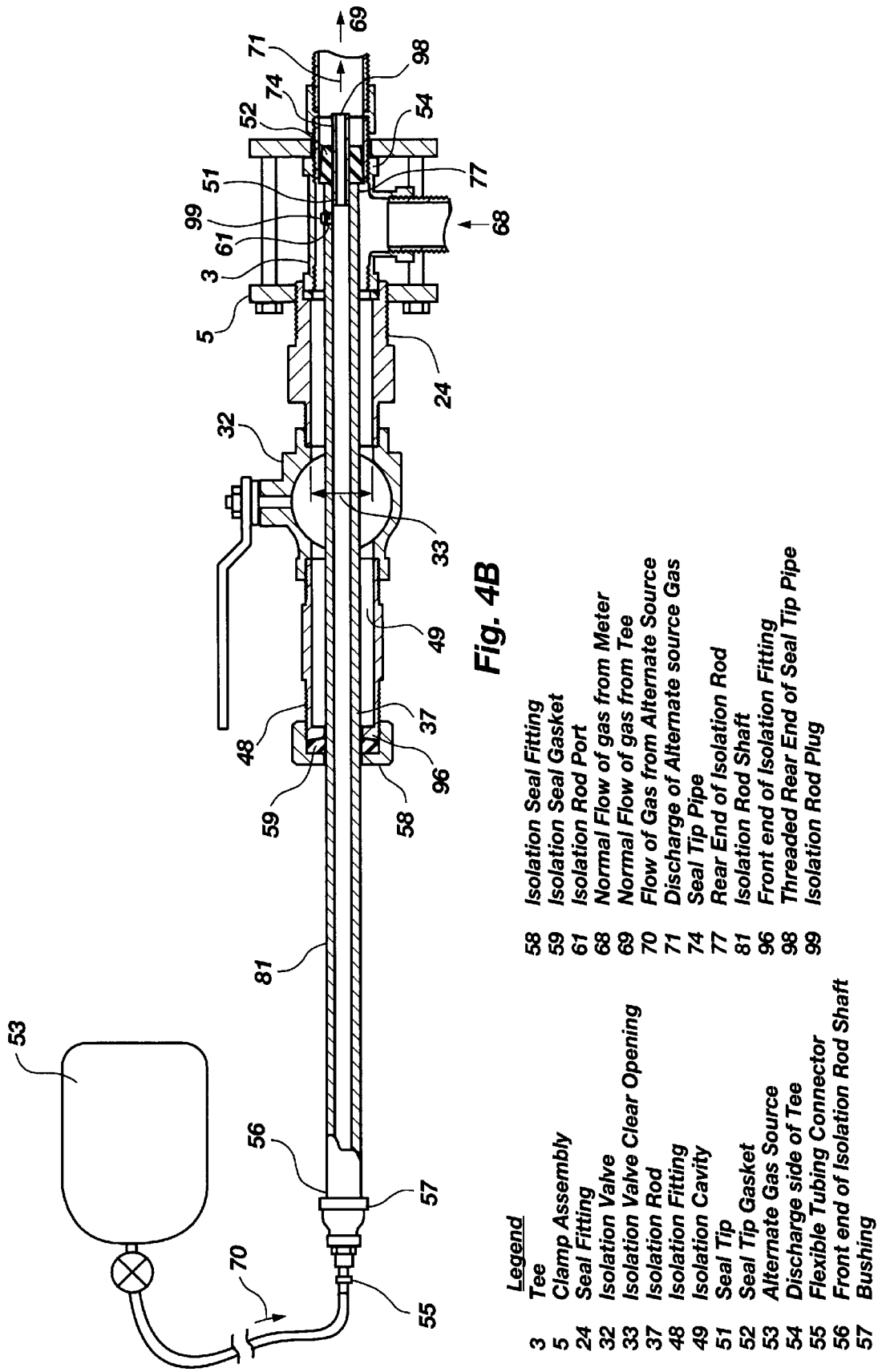

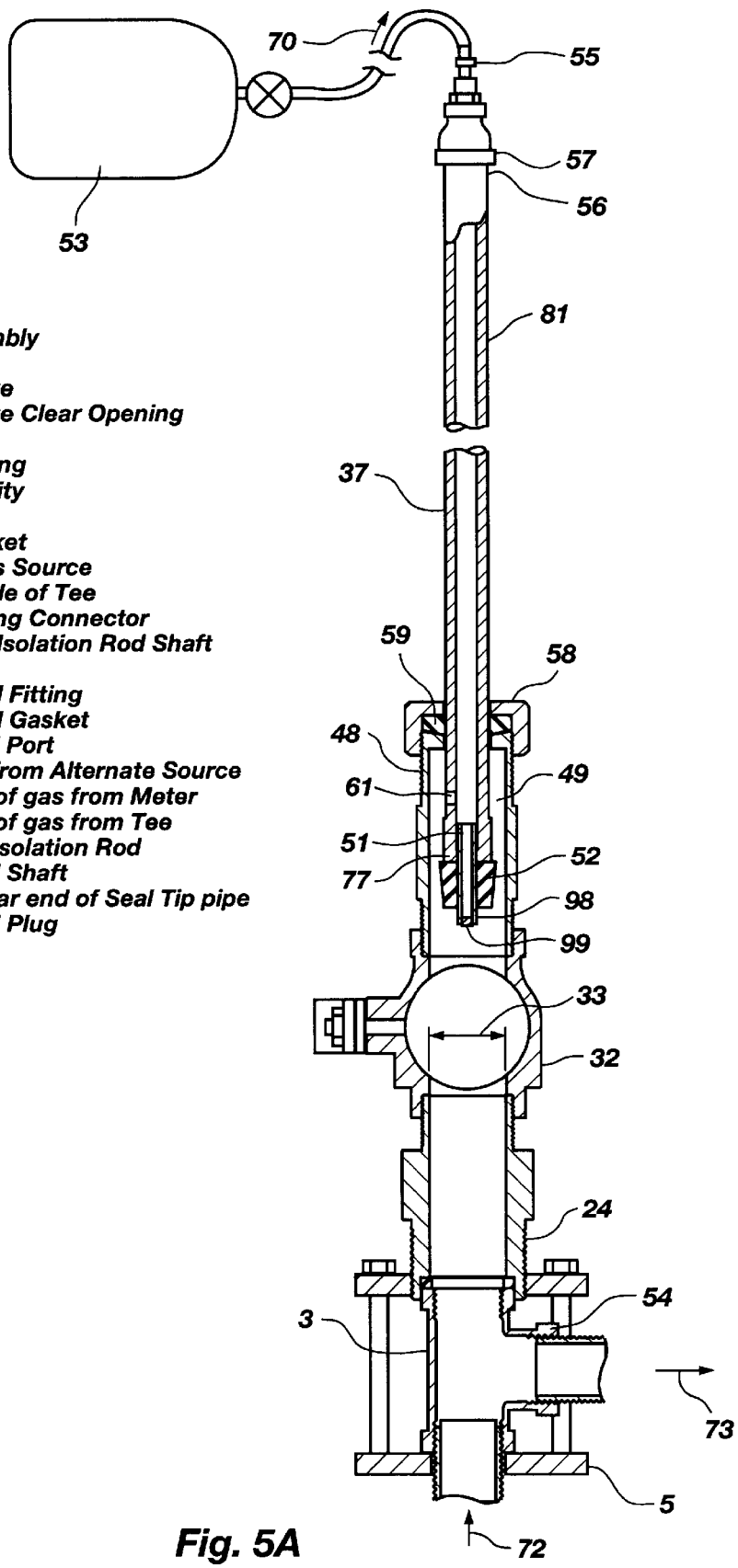

Legend
3   Tee
5   Clamp Assembly
24  Seal Fitting
32  Isolation Valve
33  Isolation Valve Clear Opening
37  Isolation Rod
48  Isolation Fitting
49  Isolation Cavity
51  Seal Tip
52  Seal Tip Gasket
53  Alternate Gas Source
54  Discharge side of Tee
55  Flexible Tubing Connector
56  Front end of Isolation Rod Shaft
57  Bushing
58  Isolation Seal Fitting
59  Isolation Seal Gasket
61  Isolation Rod Port
70  Flow of Gas from Alternate Source
72  Normal flow of gas from Meter
73  Normal flow of gas from Tee
77  Rear End of Isolation Rod
81  Isolation Rod Shaft
98  Threaded Rear end of Seal Tip pipe
99  Isolation Rod Plug

Fig. 5A

Legend
34  Plug Extraction Rod
39  Extractor Cap
40  Extraction Fitting
41  Extraction Cavity
42  Plug Extractor
44  Extraction Rod Handle
45  Front end of Extraction Rod
64  Plug Extractor Socket
65  Socket Chamber

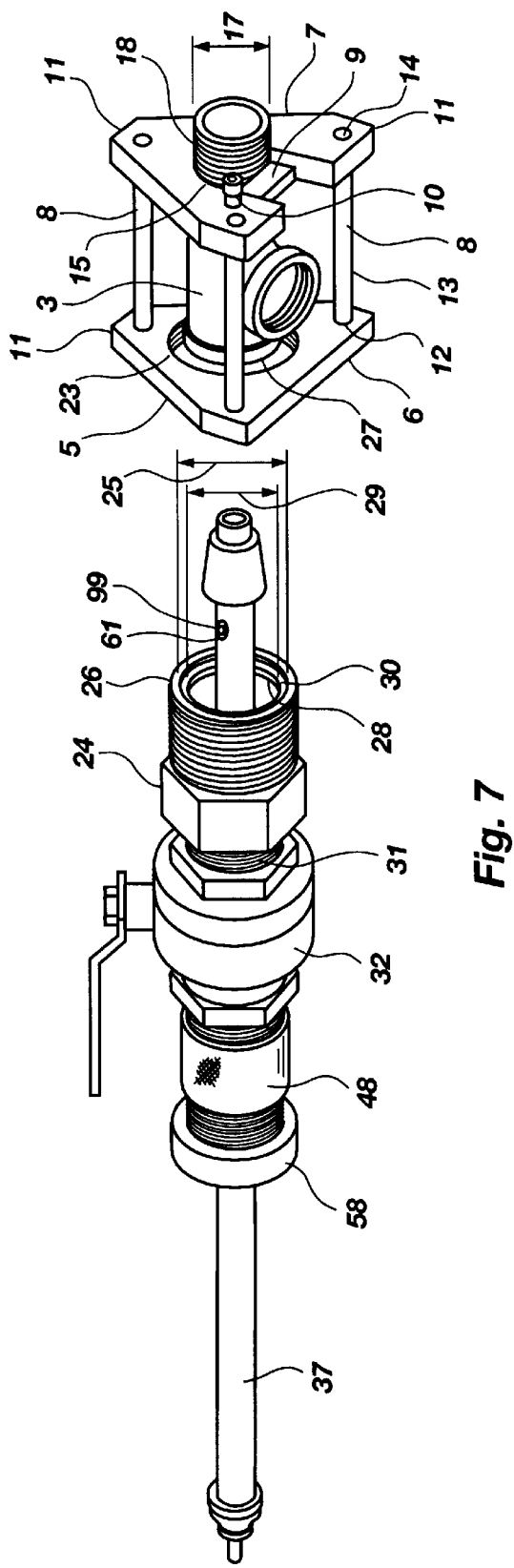

Fig. 7

Legend

| | |
|---|---|
| 3 | Tee |
| 5 | Clamp Assembly |
| 6 | Front Clamp Plate |
| 7 | Rear Clamp Plate |
| 8 | Clamp Bolt |
| 9 | Clamp Latch |
| 10 | Latch Bolt |
| 11 | Clamp Plate Corner |
| 12 | Front Clamp Plate Bolt Hole |
| 13 | Clamp Bolt Shaft |
| 14 | Rear Clamp Plate Thrd Bolt Hole |
| 15 | Rear Clamp Plate Slot |
| 17 | Outside Pipe Diameter of Rear Port Pipe |
| 18 | Rear Port Pipe |
| 23 | Threaded Front Clamp Plate Opening |
| 24 | Seal Fitting |
| 25 | Inside Diameter of Rear end of Seal Fitting |
| 26 | Rear end of Seal Fitting |
| 27 | Front end of Tee |
| 28 | Seal Collar |
| 29 | Inside Diameter of Seal Collar |
| 30 | Seal Collar Gasket |
| 31 | Front end of Seal Fitting |
| 32 | Isolation Valve |
| 37 | Isolation Rod |
| 48 | Isolation Fitting |
| 58 | Isolation Seal Fitting |
| 61 | Isolation Rod Port |
| 99 | Isolation Rod Plug |

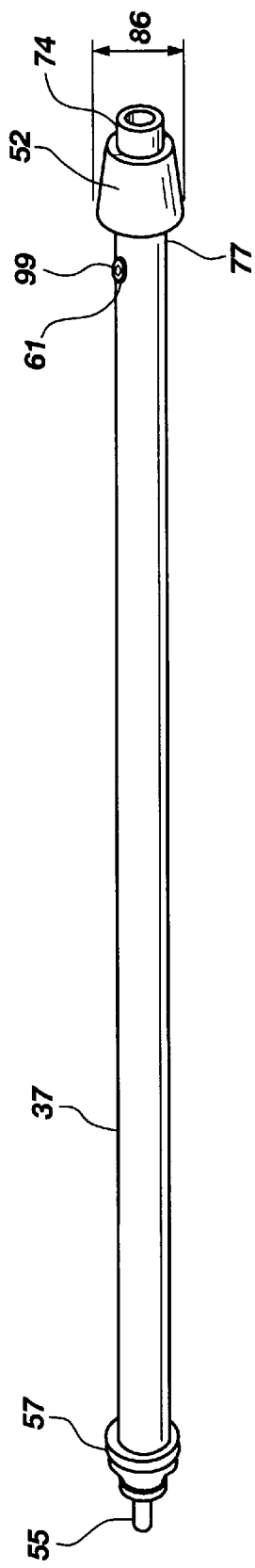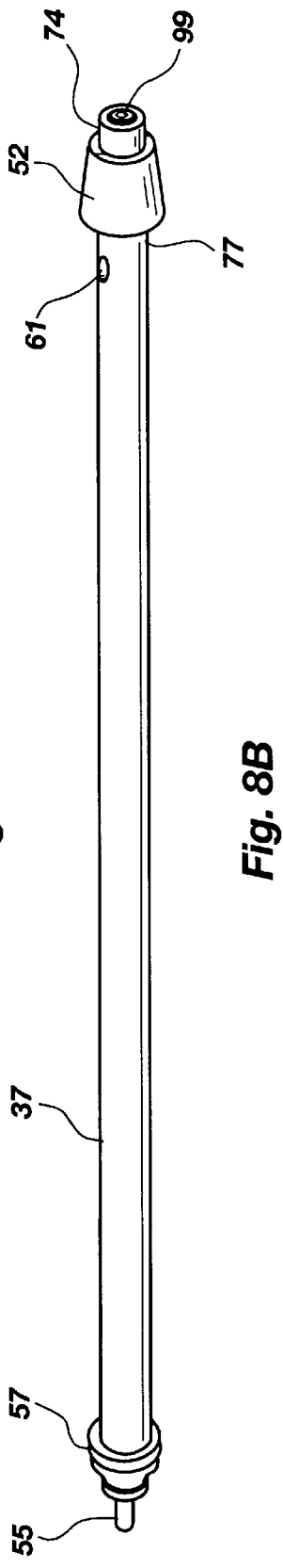
Fig. 8A
Fig. 8B
Legend
37 Isolation Rod
52 Seal Tip Gasket
55 Flexible Tubing Connector
57 Bushing
61 Isolation Rod Port
74 Seal Tip Pipe
77 Rear end of Isolation Rod
86 Ouside Seal Gasket Diameter
99 Isolation Rod Plug

Legend
37 Isolation Rod
52 Seal Tip Gasket
61 Isolation Rod Port
77 Rear End of Isolation Rod
86 Ouside Seal Gasket Diameter
90 Front Seal Tip Groove
91 Front Seal Tip Snap Ring
92 Seal Tip Washer
93 Rear Seal Tip Snap Ring
94 Rear Seal Tip Groove
99 Isolation Rod Plug
102 Threaded Rear End of Isolation Rod

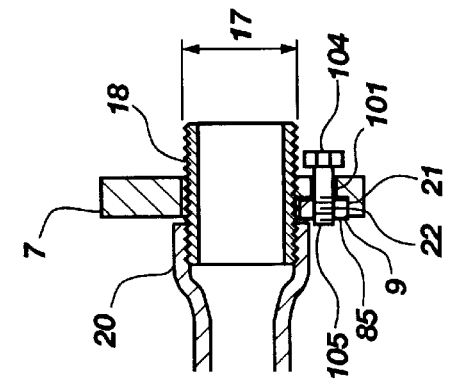

Fig. 10B

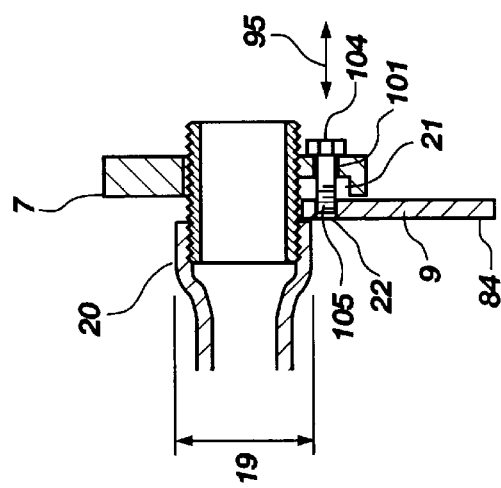

Fig. 10A

*Legend*
- 7  Rear Clamp Plate
- 9  Clamp Latch
- 17 Outside Pipe Diameter of Rear Port Pipe
- 18 Rear Port Pipe
- 19 Outside Port Diameter of Rear Tee Port
- 20 Rear Tee Port
- 21 Latch Groove
- 22 Threaded Latch Bolt Hole
- 84 Open Position of Clamp Latch
- 85 Closed Position of Clamp Latch
- 95 Axial Movement of Clamp Latch
- 101 Threaded Latch Bolt Hole
- 104 Latch Bolt Head
- 105 Threaded End of Latch Bolt

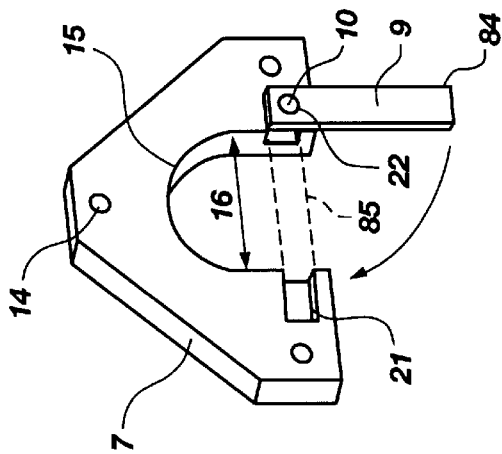

Fig. 9

*Legend*
- 7  Rear Clamp Plate
- 9  Clamp Latch
- 10 Latch Bolt
- 14 Rear Clamp Plate Thrd Bolt Hole
- 15 Rear Clamp Plate Slot
- 16 Rear Clamp Plate Slot Width
- 21 Latch Groove
- 22 Threaded Latch Bolt Hole
- 84 Open Position of Clamp Latch
- 85 Closed Position of Clamp Latch Legend
34 Plug Extraction Rod
39 Extractor Cap
40 Extraction Fitting
41 Extraction Cavity
42 Plug Extractor
44 Extraction Rod Handle
45 Front end of Extraction Rod
64 Plug Extractor Socket
65 Socket Chamber
89 Socket Slots Legend
42 Plug Extractor
64 Plug Extractor Socket
66 Magnetic Retention Element

Legend
- 7    Rear Clamp Plate
- 9    Clamp Latch
- 10   Latch Bolt
- 22   Threaded Latch Bolt Hole
- 84   Open Position of Clamp Latch
- 85   Closed Position of Clamp Latch
- 101 Latch Bolt Hole

Legend
1    Discharge Piping
2    Meter
3    Tee
78   Shut-off Valve
79   Pressure Reducing Valve
80   In-flow Piping
83   Meter Outlet
87   Inlet Meter Nut
88   Outlet Meter Nut
100 Meter Bar

Legend
1 Discharge Piping
2 Meter
3 Tee
4 Bypass Apparatus
5 Clamp Assembly
83 Meter Outlet
88 Outlet Meter Nut
97 Service Line to User

APPARATUS AND METHOD FOR GAS METER BYPASS

FIELD OF THE INVENTION

This invention relates generally to gas distribution systems and more particularly to apparatuses and methods for the service or change out of gas meters without interruption of service.

BACKGROUND OF THE INVENTION

Although natural gas meters generally operate in a reliable and trouble free manner for a number of years, if service or repair is not sooner necessitated by damage to the meter or concerns over the accuracy of the meter, all must eventually be taken out of service for maintenance, calibration or replacement. Because of safety and accuracy concerns, regulatory agencies who have jurisdiction over gas utility companies, typically require change out of gas meters within a prescribed time period. Typical mandated change out periods range from 10 to 15 years.

One of the principal concerns that gas utility company service personnel must address in changing out or servicing a meter is the necessity to accomplish the change out or service without interrupting the supply of gas to the residential or commercial user. If the supply of gas to the user is interrupted, even momentarily, pilot lights will be extinguished. At the very least, this then requires the service technician to enter the home or business and re-light the pilot lights for each of the user's appliances. Further, utility company policies and good safety practice usually require that the service technician check the user's appliances over for additional safety concerns, prior to re-lighting the pilots. If, as is often the case with residential customers and even commercial customers during non-business hours, a service technician must return to the customer's address on one or more occasions to obtain access to the customer's premises and appliances. Further, additional health and safety concerns arise in cases where property owners cannot be found for an extended period of time following a disruption of service.

Because of the foregoing concerns, gas utility companies have generally adopted the policy that meter change out or service, for all residential users and most commercial users, must be accomplished without a disruption of service. Accordingly, a number of methods and apparatuses have been developed over the years to attempt to deal with this concern. However, all of the previously disclosed methods and apparatuses have substantial limitations.

Most of the attempts to deal with this concern require special and costly piping, fittings, valves, and other apparatuses to be installed at each meter installation. Examples of this type of approach are shown in U.S. Pat. No. to Douglas 2,579,656, Mueller U.S. Pat. No. 3,187,570, Anderson U.S. Pat. No. 3,245,257, Mueller U.S. Pat. No. 3,296,861, Gilpin U.S. Pat. No. 3,444,724, England U.S. Pat. No. 5,042,526, Russell U.S. Pat. No. 5,178,188, Winnie U.S. Pat. No. 5,437,300, and Winnie U.S. Pat. No. 5,482,073. These approaches also require costly and time consuming re-plumbing of existing installations in order to retrofit existing installations with the specialized piping, fittings, valves, and other apparatuses. Another problem with a number of these attempts is that they involve the use of special apparatuses in the gas service line itself that restrict the flow of gas and involve potential for clogging, plugging, or malfunction prior to or at the time that a meter bypass is needed. For example, this problem is evident in the inventions described in U.S. Pat. No. to Russell 5,178,188, Winnie U.S. Pat. No. 5,437,300 and Winnie U.S. Pat. No. 5,482,073.

Several of the attempts to deal with this concern also substantially increase the probability of customer bypass of the meter, allowing a theft of gas by the customer. For example, this is a problem with the inventions disclosed in U.S. Pat. No. to Douglas 2,579,656, Mueller U.S. Pat. No. 3,187,570, Mueller U.S. Pat. No. 3,296,861, and Gilpin U.S. Pat. No. 3,444,724.

Also, a number of the inventions disclosed in the prior art do not provide an effective way of purging air from the piping and apparatuses or otherwise eliminating the possibility of air being introduced into the customer service line at the time of the meter bypass. Even minute amounts of air mixed with natural gas can result in a instantaneous lack of fuel or a minute explosion event occurring in an appliance pilot gas orifice, thereby extinguishing the pilot. The inventions disclosed in U.S. Pat. No. to Anderson 3,245,257, England U.S. Pat. No. 5,042,526, Winnie U.S. Pat. No. 5,437,300, and Winnie U.S. Pat. No. 5,482,073 involve the significant risk of this type of problem. It is, therefore, crucial that a bypass method or apparatus provide for the elimination of air which would ultimately find its way to the customer service line.

The most widely used method and apparatus for the change out of gas meters in the natural gas utility industry is that disclosed in U.S. Pat. No. 3,148,690 to Petersen. This method and apparatus has an advantage over the other alternatives disclosed in the prior art as identified above. This device is used with a standard meter installation with no special piping, fittings, or valves being required.

The standard meter installation preferred by most gas utility companies include a shut-off valve and a pressure regulating valve on the supply side of the meter and a standard tee on the customer side of the meter. The shut-off valve is used to turn the gas on and off for customer service.

The pressure regulating valve reduces the pressure from the higher main line pressure, which will typically ranges between 40 psi and 80 psi, to the lower pressure utilized in homes and business, which historically has ranged from the 4 oz. of pressure used for most homes to a maximum of 2 psi for some residential and commercial users. There is a growing interest in utilizing higher pressure for both homes and businesses. The use of 2 psi or higher pressures in homes allows the use of easily installed coils of smaller diameter tubing for gas systems rather than the larger ½ inch to ¾ inch iron pipe historically used, which must be installed by traditional plumbing methods. Likewise, commercial installations are now utilizing pressures of 10 psi or higher, in order to reduce the size and cost of the piping.

The standard tee on the customer size of the meter is the only fitting installed in a typical installation for use in bypassing the meter. As indicated above, the gas companies prefer this typical installation for cost and security reasons. Therefore, for a bypass apparatus to meet the needs of the gas utility companies, it must connect to this standard tee only.

As indicated above, presently the most widely used apparatus and method for gas meter change out and service is that disclosed in U.S. Pat. No. 3,148,690 to Petersen, which interfaces with the standard tee on the customer side of a meter. A principal problem with the Petersen device is that it is not adaptable to higher pressure installations. Because it incorporates a gas bladder which inflates as the alternate gas source is used to energize the customer service but must be thin and pliable enough to be gripped upon the tee plug, it is limited to the lower 4 oz applications. This device is impractical even for the 1 psi or 2 psi range now being utilized for many residential users. It is entirely unworkable for the 10 psi service pressures being utilized for some commercial applications. It is also obvious, from an examination of the device itself, that it is a cumbersome and slow method which unexpectedly meets with the continuing disfavor of service personnel. Gripping the plug, which has been pre-loosened with a wrench, by collapsing the bladder upon the plug by hand in the area of the tee, is awkward at the very least. The process of turning the plug by hand is then also slow and awkward, as the bladder must be collapsed and gripped upon the plug, the plug turned a partial revolution, and the bladder released. This process is repeated over and over until the plug is removed and falls to the bottom of the inflated bladder. Thereafter, the entire air contaminated gas contents of the inflated bladder must be bled from the bladder before a temporary plug can be advanced by hand into the tee, shutting off the gas supply from the meter and limiting the customer service to the alternate gas supply. After the change out or service work is completed, to reinstall the plug, the loose plug must be gripped by collapsing the bladder around the plug and physically moving the plug back into position to be advanced into the tee in the same manner that it was removed.

It is easy to see why service personnel would be desirous of an alternative to the method and apparatus disclosed in the Petersen patent. However, that apparatus and method is the industry standard and has been used by most utility companies for many years.

Therefore, a method and apparatus is needed which would provide for the more expeditious bypassing of a gas meter without interruption of service to the customer, which is compatible with standard meter installations, and which can be used for the full range of customer service pressures from 4 oz. up to 10 psi or more. The present invention provides a single method and apparatus for the full range of service pressures. It is fully compatible with standard meter installations as it attaches to the standard service tee. It requires no retrofit for existing meter installations.

One objective of the present invention is to provide a method and apparatus for gas meter bypass and change out which is compatible with standard gas meter installations and requires no additional fittings, piping, valves, or other apparatuses for gas meter bypass and change out.

A further objective of this present invention is to provide a method and apparatus for gas meter bypass and change out which will increase the ease and speed by which gas meter bypass and change out can be affected.

A still further objective of the present invention is to provide a method and apparatus for gas meter bypass and change out that will work efficiently and effectively for the full range of service of pressures encountered for residential and commercial users.

A still further objective of the present invention is provide a method and apparatus for gas meter bypass and change out which provides for the expeditious and reliable expulsion of air from the bypass apparatus, thereby eliminating the potential for air being mixed with the gas which is transmitted to the customer's appliances.

A still further objective of the present invention is to provide a method and apparatus for gas meter bypass and change out which minimizes the potential for customer bypass of meters and the resultant gas theft.

A still further objective of the present invention is to provide a method and apparatus for gas meter bypass and change out which is durable and reliable for continuous and high repetition use.

A still further objective of the present invention is to provide a method and apparatus for gas meter bypass and change out which would be readily accepted by service personnel and increase their productivity.

SUMMARY OF INVENTION

The present invention comprises a method and apparatus which provides for a gas meter to be replaced or serviced without interruption of the gas supply to the residential or commercial customer. The apparatus of the present invention connects to a standard tee which is utilized on the customer side of most residential or commercial gas meter installations.

The apparatus of the present invention includes a clamp assembly which is used to attach the apparatus to the standard tee. The front clamp plate of the clamp assembly has a threaded plate opening into which a seal fitting is threaded. Recessed from the rear end of the seal fitting, the seal fitting has an internal seal collar with a gasket to seal between the tee and the seal fitting.

The front end of the seal fitting is threaded to mate with an isolation valve which has an adequate clear opening for the insertion of a plug extraction rod and for the insertion of an isolation rod. The seal fitting and the isolation valve together atmospherically isolate the plug and the end port of the tee where the plug is in place.

An extraction fitting is then threaded onto the valve with the valve closed. The extraction cavity of the extraction fitting is dimensioned to accommodate a plug extractor before insertion, and to accommodate the plug extractor and an extracted plug and allow closure of the valve after extraction of the plug. After extraction of the plug and closure of the isolation valve, the extraction fitting is removed from the isolation valve.

An isolation fitting is then threaded onto the isolation valve. The isolation fitting has an isolation cavity sufficiently large to permit the retraction of a seal tip, into the cavity so that the isolation fitting can be threaded onto the valve with the valve closed, and so that the seal tip can be retracted into the isolation fitting again after the bypass is completed and the valve closed before the isolation fitting is disconnected from the valve.

There are two common configurations of the meter discharge piping and the seal tip of the isolation rod is configured differently for each of the configurations. If the meter discharge pipe connects to the side port of the tee, the isolation rod, which is a hollow pipe, provides for the passage of gas from an alternate gas source past the seal tip gasket to the discharge port of the tee. The seal tip comprises a hollow seal tip gasket of resilient material through which the rear end of the isolation rod passes, and two snap rings and a washer which hold the seal tip gasket in place. Grooves in the isolation rod provide a firm seat for the snap rings. A flexible tubing connector is attached to the front end of the isolation rod shaft. An isolation seal fitting is threaded onto the front end of the isolation fitting. The isolation seal fitting has an isolation seal gasket which seals the front end of the isolation fitting and seals around the isolation rod shaft, thereby preventing gas leakage during the meter bypass period, once the isolation seal fitting has been tightened against the front end of the isolation fitting.

If the meter discharge pipe connects to an end port of the tee, a plug is removed from a port in the shaft of the isolation rod near the seal tip gasket and is inserted in the rear end of the isolation rod, sealing the rear end of the rod, and directing the gas from the alternate source out the isolation rod port into the tee. The seal tip gasket seals off the flow of gas from the meter at the inlet port of the tee which is connected to the meter discharge piping. The alternate source gas flows out the discharge port of the tee to the user.

After meter service or change out is completed, the seal tip is retracted through the isolation valve into the isolation cavity and the isolation valve is closed. The isolation fitting is then removed from the isolation valve and the extraction fitting is threaded onto the isolation valve again with the plug extractor and the plug retracted into the extraction cavity. The isolation valve is then opened, the plug extractor extended and the plug threaded into the tee. The bypass apparatus can then be removed from the tee.

BRIEF DESCRIPTION OF THE DRAWINGS

FIG. 3A is a side view longitudinal section of a preferred embodiment of the bypass apparatus of the present invention with the isolation fitting detached, the extraction fitting attached, the plug extractor in a retracted position, and the isolation valve closed.

FIG. 3B is a side view longitudinal section of a preferred embodiment of the bypass apparatus of the present invention with the isolation fitting detached, the extraction fitting attached, the isolation valve open, and the plug extractor mated with a plug.

FIG. 3C is a side view longitudinal section of a preferred embodiment of the bypass apparatus of the present invention with the isolation fitting detached, the extraction fitting attached, the plug extractor and an extracted plug in a retracted position, and the isolation valve closed.

FIG. 4B is a side view longitudinal section of a preferred embodiment of the bypass apparatus of the present invention for use with the meter configuration shown in FIG. 1, with the extraction fitting detached, the isolation fitting attached, the isolation valve open, and the isolation rod in an extended position.

FIG. 5A is a side view longitudinal section of a preferred embodiment of the bypass apparatus of the present invention for use with the meter configuration shown in FIG. 2, with the extraction fitting detached, the isolation fitting attached, the isolation rod in a retracted position, and the isolation valve closed.

FIG. 7 is a perspective detail showing preferred embodiments of the clamp assembly, the seal fitting, the isolation valve, and the isolation fitting of the present invention.

FIG. 8A is a perspective detail showing a preferred embodiment of the isolation rod with a preferred embodiment of the seal tip of the present invention configured for use with the meter configuration shown in FIG. 1 and the isolation fitting configuration shown in FIGS. 4A and 4B.

FIG. 8B is a perspective detail showing a preferred embodiment of the isolation rod with a preferred embodiment of the seal tip of the present invention configured for use with the meter configuration shown in FIG. 2 and the isolation fitting configuration shown in FIGS. 5A and 5B.

FIG. 9 is a perspective detail of a preferred embodiment of the rear clamp plate and clamp latch of the present invention.

FIG. 10A is a cross section detail of a preferred embodiment of the rear clamp plate and clamp latch of the present invention with the clamp latch in an open position.

FIG. 10B is a cross section detail of a preferred embodiment of the rear clamp plate and clamp latch of the present invention with the clamp latch in a closed position.

DETAILED DESCRIPTION OF PREFERRED EMBODIMENTS

Figure 1:
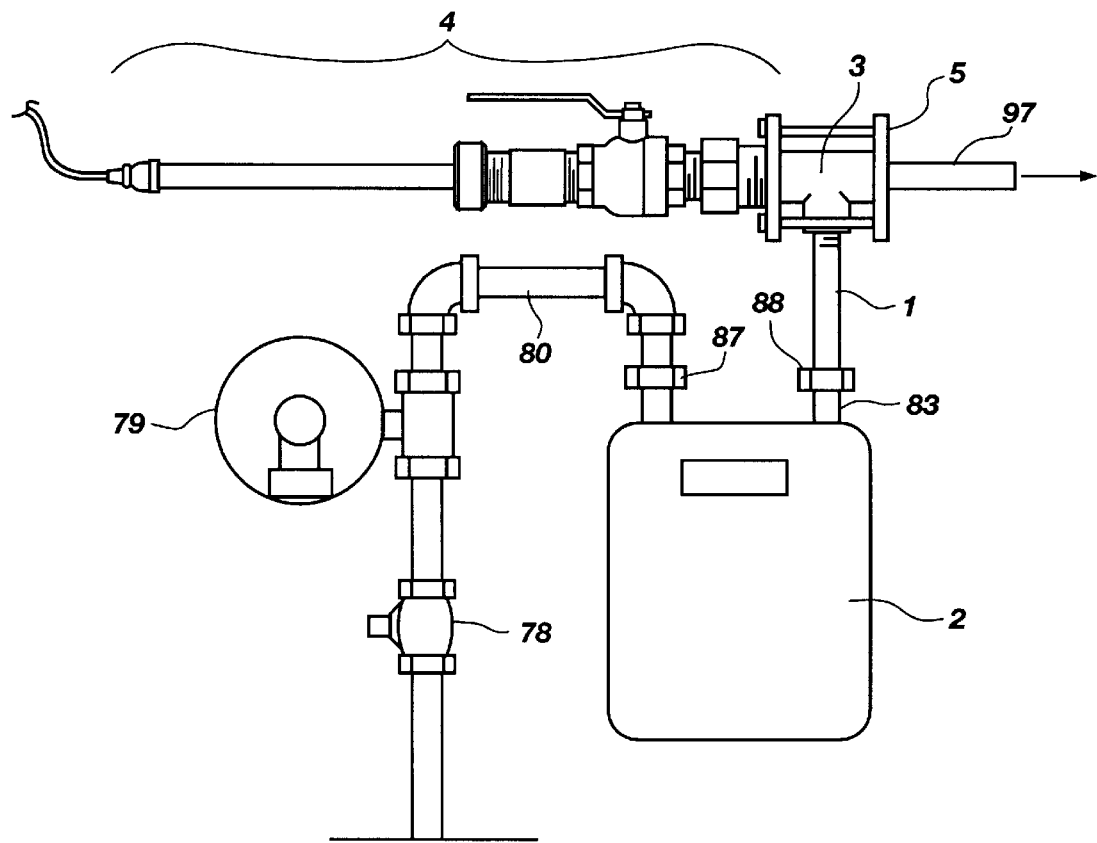
FIG. 1 is an elevation view of a typical gas meter installation having a common meter discharge piping arrangement with a preferred embodiment of the bypass apparatus of the present invention connected.

Referring first to FIG. 1, a common meter installation is represented. A common meter installation includes inflow piping 80, a shutoff valve 78, a pressure reducing valve 79, a meter 2, and discharge piping 1. The discharge piping from the meter includes a tee 3 to which a bypass apparatus 4 of the present invention is attached. The bypass apparatus includes a clamp assembly 5 by which the bypass apparatus attaches to the tee.

Referring to FIG. 7, for preferred embodiments the clamp assembly 5 is comprised of a front clamp plate 6, a rear clamp plate 7, clamp bolts 8, a clamp latch 9 and a latch bolt 10. For certain preferred embodiments, the front clamp plate and the rear clamp plate are triangular in shape as shown in FIG. 7, and are attached by threaded clamp bolts near each of the corners 11 of the plates. For other preferred embodiments the clamp plates may be square or may have other shapes and may have two or more clamp bolts. Under preferred embodiments, the front clamp plate has bolt holes 12 which pass the shafts 13 of the clamp bolts and the rear clamp plate has threaded bolt holes 14 to receive the threaded ends of the clamp bolts.

Referring to FIG. 9, the rear clamp plate 7 has a rear clamp plate slot 15 with a slot width 16. Referring also to FIGS. 10A and 10B, this slot width is larger than the outside pipe diameter 17 of the rear port pipe 18 and is smaller than the outside port diameter 19 of the rear tee port 20. The rear clamp plate also has a latch groove 21 dimensioned to receive the latch as the clamp latch is rotated with the latch bolt 10 from an open position of the latch 84 to the closed position of the latch 85, the clamp latch is aligned with the latch groove, and the clamp latch is depressed into the latch groove as shown in FIG. 10B. The latch bolt hole 101 is dimensioned to permit the free rotation of the latch bolt and the axial movement 95 of the latch into and out of the latch groove as shown in FIGS. 10A and 10B. The latch bolt head 104 limits the axial movement of the latch. For some preferred embodiments the end of the latch bolt 105 is threaded and is secured to the clamp latch by threading the latch bolt into the threaded latch bolt hole 22.

Figure 13:
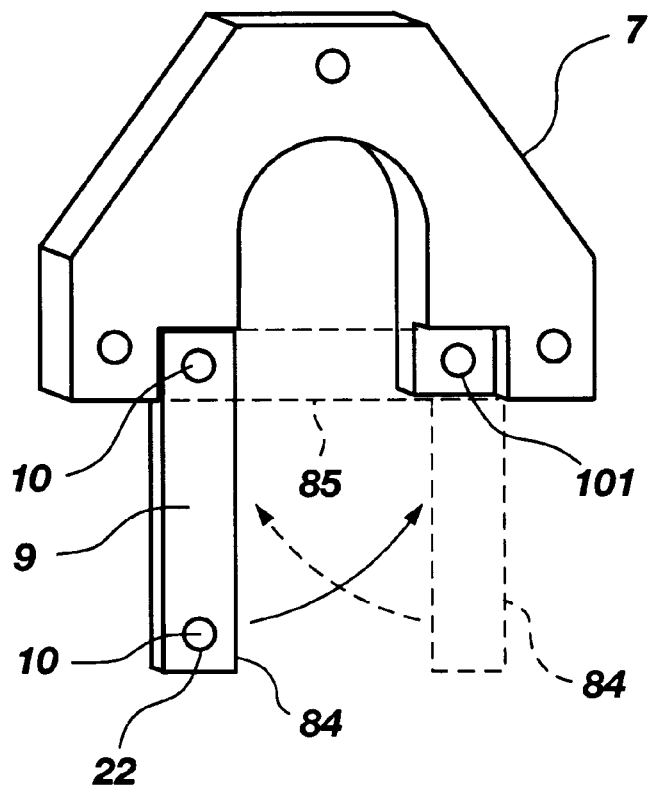
FIG. 13 is a perspective detail of an alternative preferred embodiment of the clamp latch of the present invention with two latch bolts.

An alternative embodiment of the latch groove and latch is shown in FIG. 13. For this embodiment, the clamp latch 9 has a latch bolt 10 near each end of the latch and the latch groove 21 is dimensioned to allow the latch to swing between an open position 84 and the up position 85 about either of the two latch bolts. The latch is secured in the up position by threading both latch bolts into the corresponding threaded latch bolt holes 22.

Referring again to FIG. 7, the front clamp plate has a threaded plate opening 23 into which a seal fitting 24 is threaded as shown in FIG. 3. The inside diameter 25 of the rear end 26 of the seal fitting is larger than the outside diameter of the front end 27 of the tee. Recessed from the rear end of the seal fitting, the seal fitting has an internal seal collar 28, the inside diameter 29 of which is smaller than the outside diameter of the front end of the tee. A seal collar gasket 30 is positioned upon the seal collar to seal between the front end of the front tee port and the seal fitting as shown in FIG. 3A.

For preferred embodiments, the front end 31 of the seal fitting is threaded to mate with an isolation valve 32. A ball valve is a preferred type of valve for the isolation valve but other types of valves may be used so long as an adequate clear opening 33 is provided for the insertion of a plug extraction rod 34 as shown in FIG. 3B and for the insertion of an isolation rod 37 as shown in FIG. 4B, and FIG. 5B.

Figure 6:
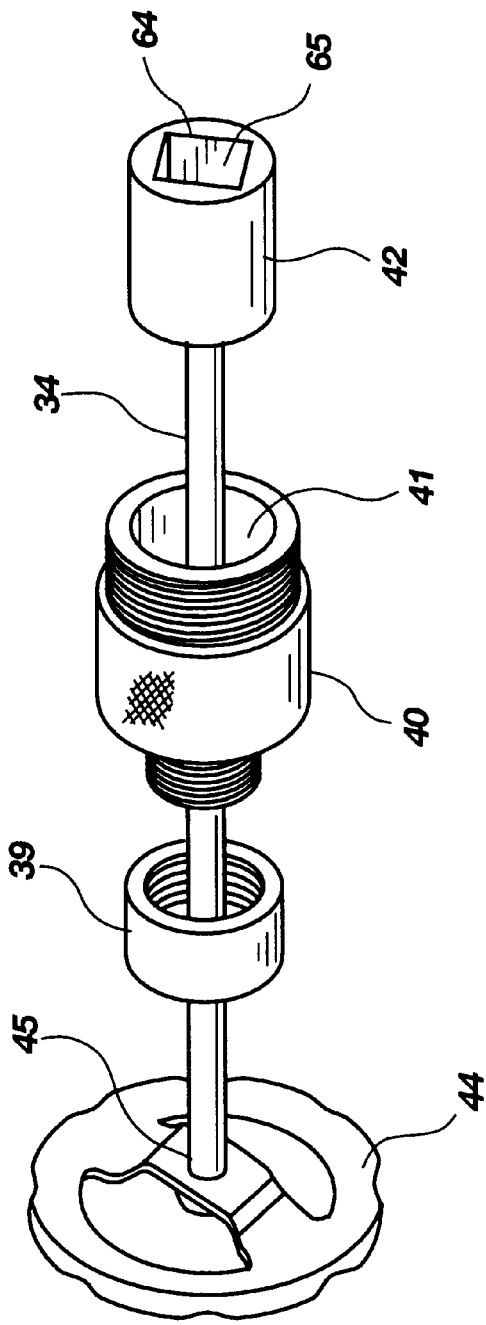
FIG. 6 is a perspective detail of a preferred embodiment of an extraction fitting of the bypass apparatus of the present invention.

For the plug extraction configuration shown in FIG. 3A, 3B and 3C, an extraction fitting 40 is threaded onto the isolation valve 32 with the valve closed as shown in FIG. 3A. Referring also to FIG. 6, the extraction cavity 41 of the extraction fitting is dimensioned to accommodate the plug extractor 42 before insertion as shown in FIG. 3A and to accommodate the plug extractor and an extracted plug 43 and allow closure of the valve after extraction of the plug as shown in FIG. 3C. For preferred embodiments, the extraction rod shaft way 36 is dimensioned to fit the plug extraction rod 34 with a desired tolerance so that gas leakage through the annular space between the extraction rod shaft 82 and the extraction rod shaft way can be controlled while the plug is being extracted or re-inserted.

For some preferred embodiments, the front end 38 of the extraction fitting is threaded for use of an extractor cap 39.

A cap seal gasket 62 is used to seal off the gas leakage from the extraction rod shaft way by tightening the extractor cap. An extractor handle 44 which can be a wheel or other suitable type handle is affixed to the front end 45 of the extraction rod to provide for leverage in extracting and reinserting the plug. For preferred embodiments the seal fitting, the extraction fitting and the extractor cap are provided with hand grip surfaces 46, 47, 63 to facilitate installation of these fittings by hand, preferably without the use of tools.

Referring to FIG. 6, the geometric design of the plug extractor socket 64 can be selected to maximize the capability of the socket to grip the plug during extraction and re-insertion. To enhance the ability of the socket to retain the plug, the socket chamber 65 may be coated with an adhesive. Alternatively the socket chamber can be formed of a metal which is substantially softer than the metal in a standard plug, which inherently will increase the gripping ability of the socket as compared to a socket chamber formed of metal with a hardness comparable to the plug.

Figure 12:
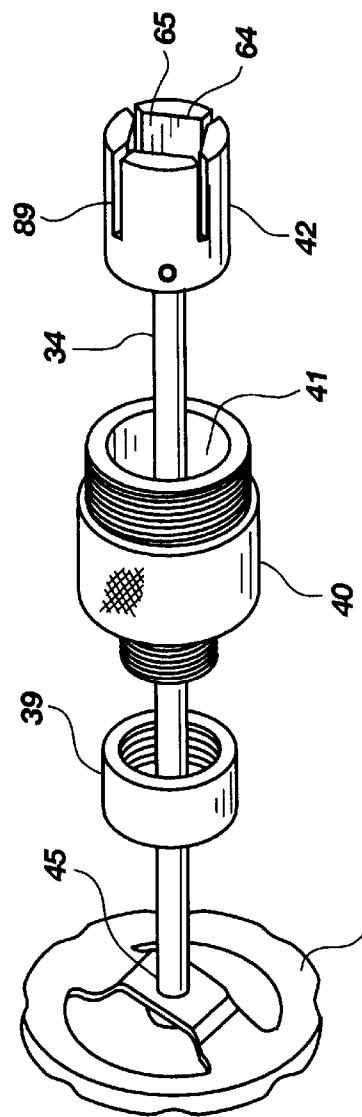
FIG. 12 is a perspective section detail of a preferred embodiment of the plug extraction fitting and plug extractor of present invention with a slotted plug extractor socket.
Figure 11:
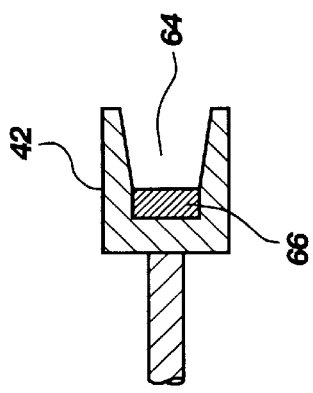
FIG. 11 is a cross section detail of a preferred embodiment of the plug extractor socket of the present invention with a magnetic insert.

Alternatively, the socket may be equipped with a magnetic retention element 66 such as that shown in FIG. 11, or a mechanical locking device. The socket may also have slots 89 as shown in FIG. 12 to aid in the retention of the extracted plug.

Figure 4A:
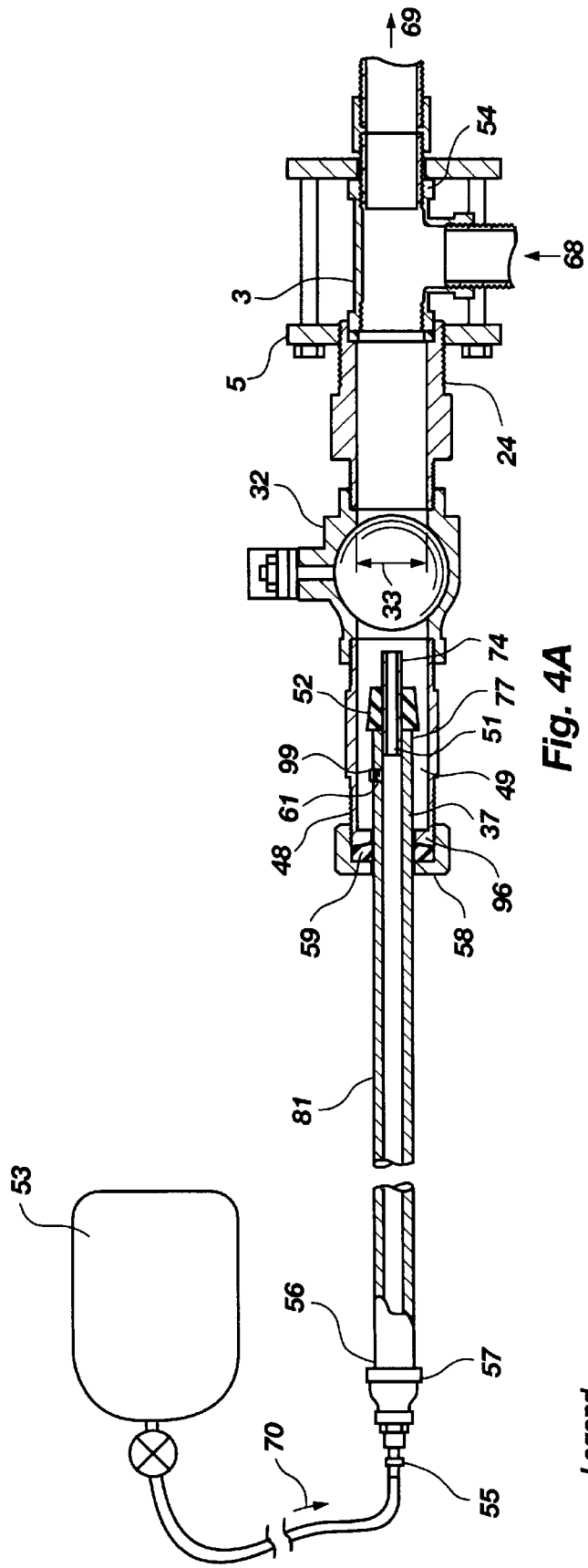
FIG. 4A is a side view longitudinal section of a preferred embodiment of the bypass apparatus of the present invention for use with the meter configuration shown in FIG. 1, with the extraction fitting detached, the isolation fitting attached, the isolation rod in a retracted position, and the isolation valve closed.
Figure 5B:
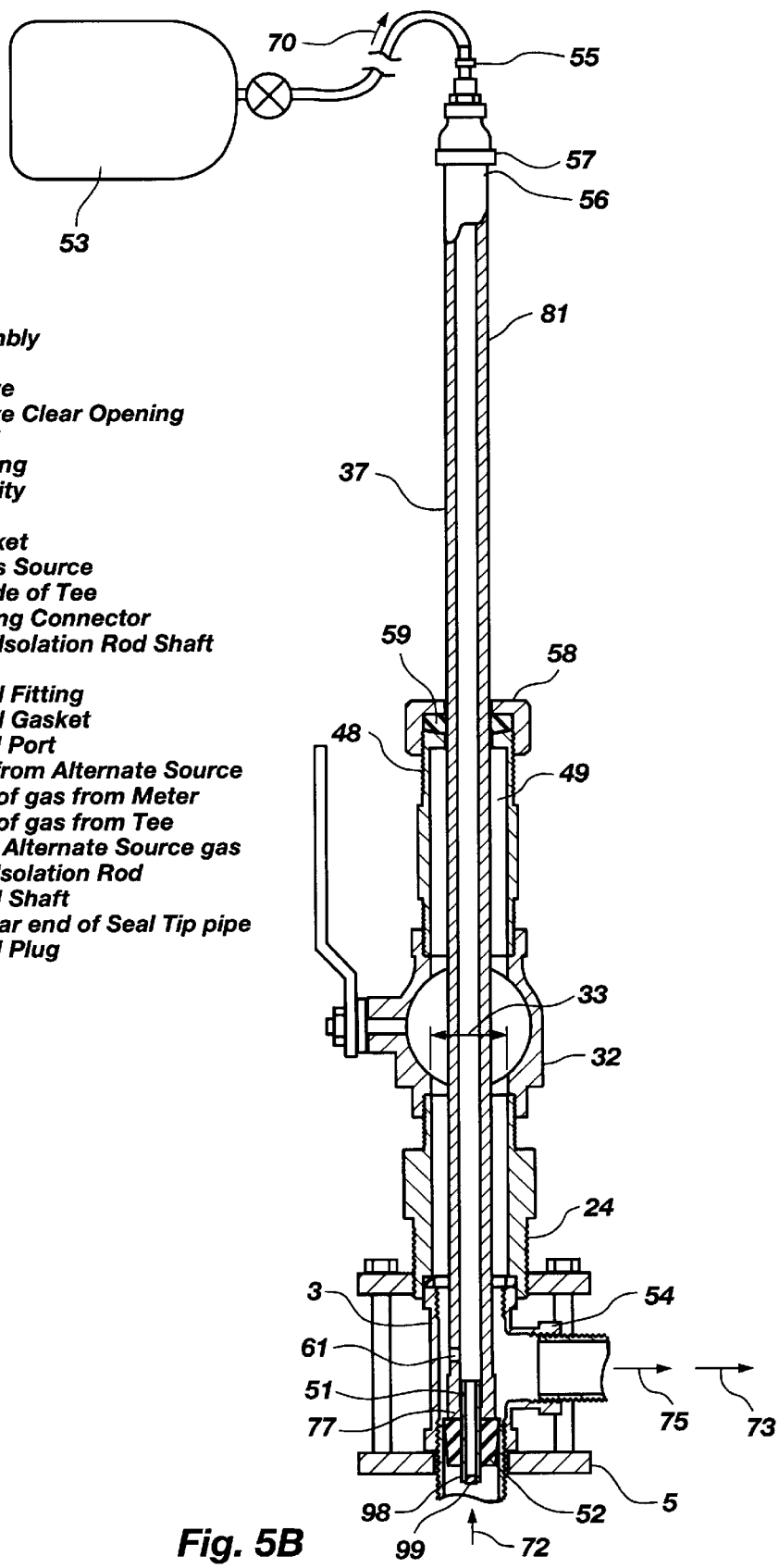
FIG. 5B is a side view longitudinal section of a preferred embodiment of the bypass apparatus of the present invention for use with the meter configuration shown in FIG. 2, with the extraction fitting detached, the isolation fitting attached, the isolation valve open, and the isolation rod in an extended position.

For the meter isolation configuration shown in FIGS. 4A and 4B and the configuration shown in FIGS. 5A and 5B, an isolation fitting 48 is threaded into the isolation valve 32. The isolation cavity 49 of the isolation fitting is sufficiently large to permit the retraction of the seal tip 51, including the seal tip gasket 52, of the isolation rod 37 into the cavity so that the isolation fitting can be threaded into the valve with the valve closed as shown in FIGS. 4A and 5A, and so that the seal tip can be retracted into the isolation fitting again after the bypass is completed and the valve closed before the isolation fitting is disconnected from the valve.

For the meter configuration shown in FIG. 1, the isolation rod has an isolation rod shaft 81 which is a hollow pipe which provides for the passage of gas from the alternate gas source 53 past the seal tip 51 to the discharge side 54 of the tee as shown in FIG. 4B. A flexible tubing connector 55 is attached to the front end 56 of the isolation rod shaft by a standard bushing 57 or other suitable fitting. An isolation seal fitting 58 is threaded onto the front end of the isolation fitting 96. The isolation seal fitting has an isolation seal gasket 59 which seals the front end of the isolation fitting and seals around the isolation rod shaft, thereby preventing gas leakage during the meter bypass period, once the isolation seal fitting has been tightened against the front end of the isolation fitting. For this configuration for some preferred embodiments, the seal tip comprises a seal tip pipe 74 which connects to the rear end 77 of the isolation rod, and a seal tip gasket 52 of resilient material. The seal tip pipe passes through the seal tip gasket to provide for discharge 71 of the alternate source gas from the discharge port 54 of the tee. For certain preferred embodiments the rear end of the isolation rod is internally threaded, the seal tip pipe is externally threaded and the seal tip pipe is secured in place by threading it into the rear end of the isolation rod. However, other means for connecting the seal tip pipe and the isolation rod can be used. A perspective view of this embodiment of the isolation rod and seal tip is shown in FIG. 8A.

Figure 8D:
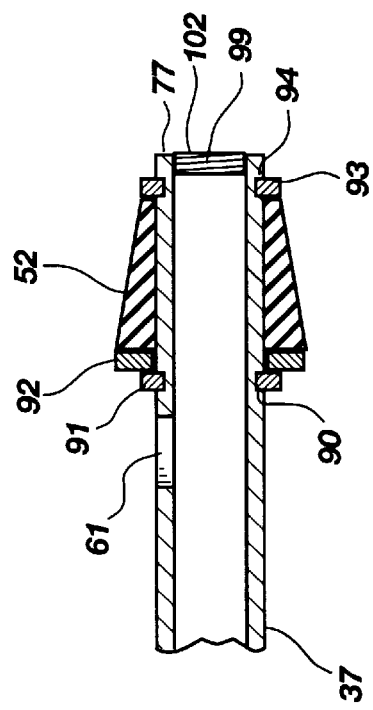
FIG. 8D is a cross section detail showing an alternative preferred embodiment of a seal tip with the isolation rod extending through the seal tip gasket, for use with the meter configuration shown in FIG. 2 and the isolation rod configuration shown in FIGS. 5A and 5B.
Figure 8C:
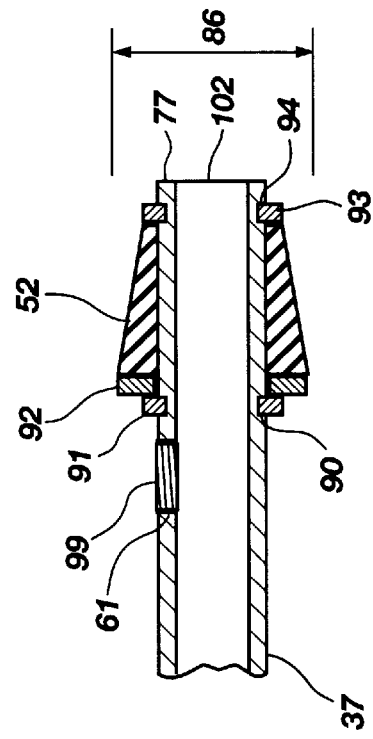
FIG. 8C is a cross section detail showing an alternative preferred embodiment of a seal tip with the isolation rod extending through the seal tip gasket, for use with the meter configuration shown in FIG. 1 and the isolation rod configuration shown in FIGS. 4A and 4B,.

Referring to FIG. 8C, other embodiments of the seal tip pipe provide that the rear end 77 of the isolation rod passes through the seal tip gasket 52, and the seal tip gasket is held in place by a front seal tip snap ring 91, a seal tip washer 92, and a rear seal tip snap ring 93. The front seal tip snap ring is fixed in place by a front seal tip groove 90 and the rear seal tip snap ring is fixed in place by a rear seal tip groove 94.

Figure 2:
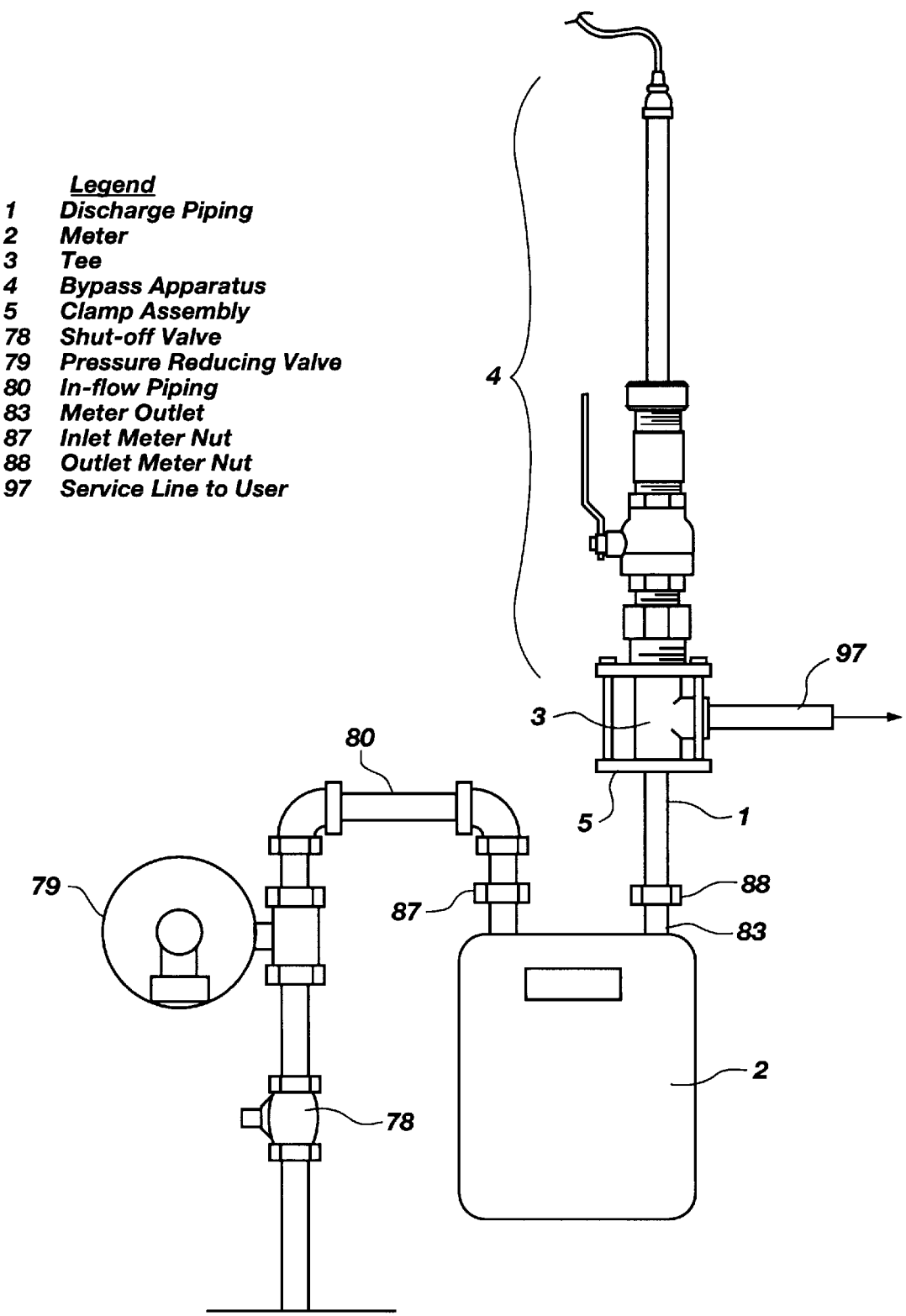
FIG. 2 is a elevation view of a typical gas meter installation having an alternative common meter discharge piping arrangement with an alternative preferred embodiment of the bypass apparatus of the present invention connected.

For the meter configuration shown in FIG. 2, an isolation rod plug 99 is removed from an isolation rod port 61 and the isolation rod plug is threaded into the threaded rear end 98 of the seal tip pipe as shown in FIG. 5A or the threaded rear end 102 of the isolation rod as shown in FIG. 8D. Referring also to FIGS. 5A and 5B, in this configuration the inlet pipe 76 connected to the inlet port 60 of the tee is sealed off by the seal tip gasket 52 as shown in FIG. 5B, and the alternate source gas is discharged from the isolation rod by the isolation rod port 61 in the isolation rod near the rear end 77 of the isolation rod. While the embodiment of the seal tip shown in FIGS. 8A and 8B, and the embodiment shown in FIGS. 8C and 8D have only one isolation rod port, other embodiments may provide for a plurality of isolation rod ports which are plugged for use with the meter configuration shown in FIG. 1, and are unplugged for use with the meter configuration shown in FIG. 2. For those embodiments of the seal tip, the rear end of the seal tip pipe 98 as shown in FIG. 5A or the rear end of the isolation rod 102 as shown in FIG. 8D is plugged with one of the isolation rod plugs for use with the meter configuration shown in FIG. 2.

The preferred embodiments of the components of the meter bypass apparatus described above and shown in the drawings generally utilize threaded connections or joints. However, flanged and bolted, screwed, mechanical joint and other types of connections or joints can be used for any or all of the connections or joints between the components.

Figure 14:
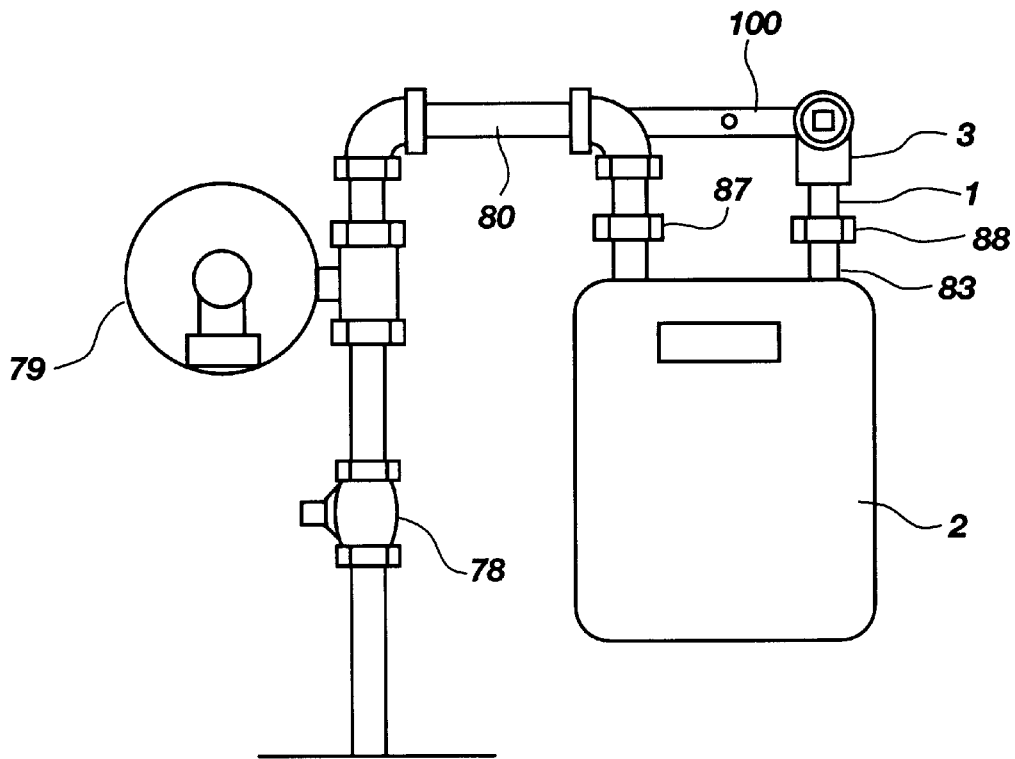
FIG. 14 is an elevation view of a gas meter installation having a meter bar rather than the common inflow and discharge piping arrangement.
Figure 15:
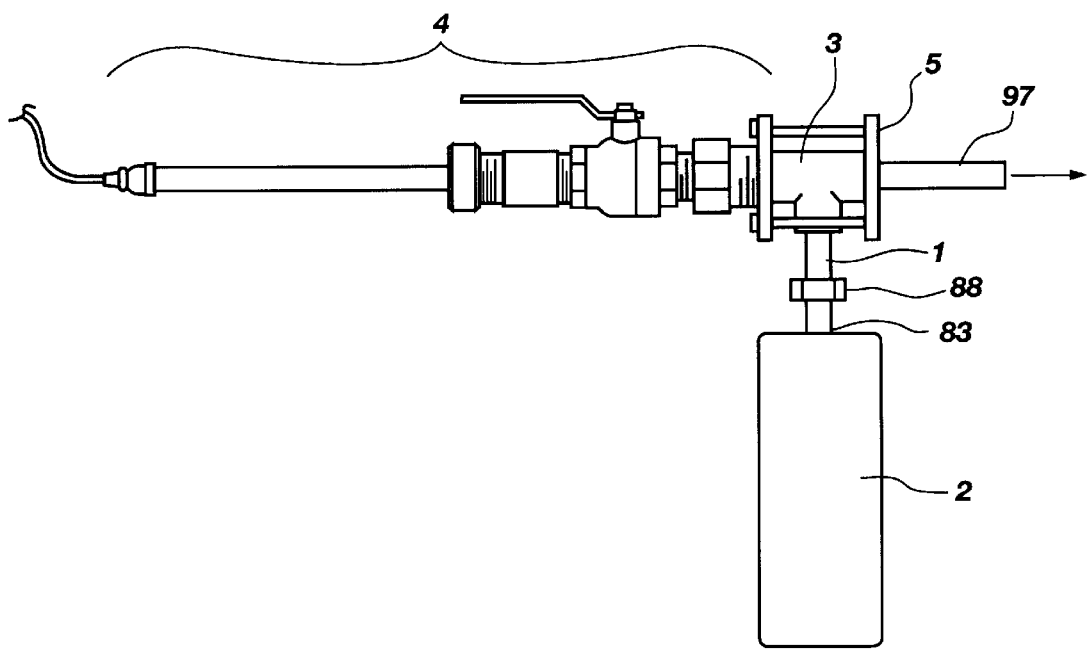
FIG. 15 is a side elevation view of a gas meter having a meter bar with a preferred embodiment of the bypass apparatus of the present invention connected.

Embodiments of the present invention can also be used with meter installations having a meter bar 100 such as that shown in FIG. 14. Referring to FIG. 15, embodiments of the bypass apparatus for use with a meter bar are identical to or very similar to that used with the meter installation shown in FIG. 1.

The manner in which preferred embodiments are utilized is as follows. Referring to FIG. 1, typically, gas meters are set with the tee 3 above the outlet 83 of the meter with the meter discharge piping 1 connected to the side port of the tee. When the meter is in service, the plug is in an end port opposite the end port to which the service line 97 to the user is connected. Referring now to FIG. 2, alternatively, the discharge piping of the meter may connect to an end port of the tee with the service line to the user connected to the side port of the tee as shown in FIG. 2. In this configuration the plug is in the end port of the tee opposite the port to which the meter discharge pipe is connected.

For either of the configurations shown in FIG. 1 or FIG. 2, the service person may first loosen but not remove the plug. If the plug has been in place for months or years and corrosion may be present in the front end port, this will facilitate removal of the plug after the bypass apparatus is in place.

With the clamp latch in an open position 84 as shown in FIG. 9, the clamp assembly 5 is fitted over the tee with the slotted rear clamp plate inserted over the rear port pipe 18 as shown in FIG. 7. The rear port pipe is connected to the rear end port 20 of the tee, which is opposite the front end port 103 of the tee which contains the plug. The threaded clamp bolts are then adjusted, squaring up the front clamp plate with the front end port. Then the latch is rotated to the closed position 85 as shown in FIG. 9, the latch is moved into the latch groove 21 as shown in FIG. 10B.

Referring to FIG. 3A, the seal fitting 24 is then threaded into the front clamp plate, aligning the seal fitting with the front port. The seal fitting is threaded into the front clamp plate until the front end 27 of the tee contacts and compresses the seal collar gasket 30, and the rear end port of the tee presses against the rear clamp plate and the clamp latch, securing the clamp latch in the latch groove and the clamp assembly to the tee as shown in FIG. 7. The latch bolts can be threaded further into the rear clamp plate or loosened as needed to adjust the fit of the clamp assembly to the tee.

Next, the isolation valve 32 is threaded onto the seal fitting and tightened in place. The seal fitting and the isolation valve together atmospherically isolate the plug and front port of the tee. Then the extraction fitting 48, with the plug extractor retracted into the extraction cavity, is threaded onto the isolation valve and tightened securely. The extractor cap 58 should then be loosened on the extraction fitting.

With the isolation valve in the open position, the extraction rod handle is grasped and the plug extraction rod is pushed through the open isolation valve and the seal fitting until the socket of the plug extractor contacts the plug. The handle is then used to rotate the plug extractor until it slips over and grips the plug. The handle is then rotated counter-clockwise to remove the plug from the tee.

As the plug is removed from the tee, gas enters the seal fitting, the isolation valve and the extraction fitting under pressure, and the gas is mixed with the air present inside those components. The extractor cap should be in a loosened position at the time that the plug is removed from the tee to allow all this impure gas, the gas mixed with air, to be purged from the seal fitting, the isolation valve and the extraction fitting through the front of the extraction fitting past the extractor cap seal gasket and the extractor cap. When the service person is satisfied that all the impure gas has been purged, the extractor cap can be tightened onto the extraction fitting, compressing the cap seal gasket against the plug extraction rod, thereby preventing further gas leakage through the annular space between the plug extraction rod shaft and the extraction rod shaft way. The plug extractor with the plug gripped therein is then retracted through the open isolation valve into the extraction cavity and the isolation valve is closed. The extraction fitting is then threaded off the isolation valve.

With the seal tip and seal tip gasket retracted into the isolation cavity, the isolation fitting is loosely threaded onto the isolation valve as shown in FIG. 4A. With the isolation seal fitting and the isolator cap also in a loosened condition, the flow of gas 70 from the alternate gas source is started. The pressure of the gas supplied by the alternate gas source must be adjusted to roughly match the pressure of the gas coming from the meter 68, so that pilot lights, furnaces and appliances are not disrupted by fluctuations in the gas pressure at the time of switch over to the alternate gas source. Again, air in the flexible tubing, the isolation rod, and the isolation cavity is mixed with gas and must be purged. The impure gas is allowed to leak out of the joint between the isolation fitting and the isolation valve and the joint between the isolation fitting and the isolation seal fitting. The flow of gas from the alternate gas source is continued until the service person is satisfied that all the impure gas has been purged, and the isolation fitting and the isolation seal fitting are then each tightened into place. This compresses the isolation seal gasket and seals the front end of the isolation fitting and seals around the isolation rod shaft, thereby preventing further gas leakage. The isolation valve is then opened.

The isolation rod is advanced through the open isolation valve, the seal fitting, and the front port of the tee, until the seal tip gasket mates with the rear port pipe. The outside seal tip gasket diameter 86 is smaller than the inside diameter of the front end port of the tee and is larger than the inside diameter of the rear port pipe. The seal tip gasket will therefore pass through the front port of the tee and seal off the rear port pipe, stopping the normal flow of gas from the meter 68 and the normal flow of gas from the tee 69. For the meter configuration shown in FIG. 1, if the pressure of the gas from the alternate source is slightly less than the pressure of the gas coming from the meter, the pressure differential will help keep the seal tip gasket seated so long as the meter is pressurized. When the meter shutoff valve is closed, de-pressurizing the meter, a means is necessary to keep the seal tip gasket seated. The isolation seal fitting is tightened after the seal tip gasket is seated in the rear port pipe and this holds the isolation rod firmly in place despite the pressure which tends to unseat the seal tip gasket and further seals off the leakage of gas from the bypass apparatus.

For the meter configuration shown in FIG. 2 and the isolation fitting configuration shown in FIG. 5B, if the alternate source pressure is adjusted to slightly greater than the pressure of the gas normally flowing from the meter 72, the pressure of the alternate source gas 70 will tend to keep the seal tip gasket seated whether the meter shutoff valve is open or closed. However, to prevent accidental unseating of the seal tip gasket and a resultant loss of pressure, the isolation seal fitting should be tightened in this configuration also after the seal tip gasket has been seated in place.

The customer service then is being supplied from the alternate gas source, and the normal flow of gas 72 from the meter and from the tee 73 is blocked. The meter shutoff valve 78 may then be closed and the meter can be serviced or replaced.

When the service personnel have finished the service or change-out of the meter and are ready to place the meter in service, the meter must first be purged. This is accomplished by tightening the inlet meter nut 87 onto the meter but only loosely threading the outlet meter nut 88 onto the meter. The main gas supply is then turned on until the meter is fully purged. Then the outlet meter nut is tightened.

Next, for the meter installation configuration shown in FIG. 1, while the isolation rod is held firmly in place by a service person, the isolation seal fitting is loosened, allowing the main gas supply to purge the meter discharge piping, the tee, the seal fitting, the isolation valve, and the isolation fitting. When the service person is satisfied that the meter, the piping and the bypass apparatus are sufficiently purged, the seal tip gasket is unseated from the rear port pipe, the seal tip gasket and seal tip are retracted through the seal fitting and the isolation valve into the isolation cavity, and the isolation valve is closed. The alternate gas source is then shut off and the isolation fitting is screwed off the isolation valve.

Next an approved sealant is normally placed on the plug threads, and the extraction fitting, with the plug extractor and the gripped plug retracted into the extraction cavity, is threaded onto the isolation valve. With the extractor cap loosened, the isolation valve is opened. After the extraction fitting has been fully purged, the extractor cap is tightened until the gas no longer escapes. The plug extractor and the plug are advanced through the isolation valve and the seal fitting to contact the front end of the tee. The extraction rod handle is rotated counterclockwise one full turn. Then the handle is rotated slowly, ensuring that the plug is threading correctly into the front port of the tee. The plug is advanced until it fits snugly in the tee. The plug extractor is then loosened from the plug and retracted into the extraction cavity.

Under preferred embodiments of the method of the present invention, the isolation valve is then closed and the extraction fitting is screwed off of the isolation valve. The isolation valve is then opened partially. If gas is still leaking at a rate which indicates that the plug may not have been reinserted correctly, the isolation valve is closed and the plug extraction fitting threaded back onto the isolation valve. The plug is then removed and reinserted as needed to accomplish a correct reinstallation of the plug. Once the leakage from the reinserted plug is stopped or is deemed acceptable to the service person, the isolation valve is screwed off of the seal fitting and the seal fitting is threaded out of the front clamp plate. The clamp assembly is then loosened and removed from the tee. The plug can then be further tightened into the tee with a wrench as desired to stop any remaining leakage.

Other embodiments of the invention and other variations and modifications of the embodiments described above will be obvious to a person skilled in the art. Therefore, the foregoing is intended to be merely illustrative of the invention and the invention is limited only by the following claims.

What is claimed is:

1. Apparatus for live bypass of a gas meter comprising:
    a) means for live extraction of a plug from an end port of a tee fitting that is connected to discharge piping of said meter, for containing the flow of gas from said end port during and after extraction of said plug, and for reinsertion of said plug, wherein said means is a control and actuating means providing for extraction and removal of said plug from said apparatus; and
    b) means for controllably supplying gas from an alternate source rough said end port to said meter discharge piping after removal of said plug from said apparatus, for containment of the flow of gas from said end port, for sealing off the flow of gas from said meter so that the meter can be de-pressurized and then serviced or removed and replaced, and for restoring the flow of gas from the meter or its replacement meter after the meter has been serviced or replaced.

2. Apparatus as claimed in claim 1 further comprising means for purging impure gas from said apparatus.

3. Apparatus for live bypass of a gas meter comprising:
    a) means for live extraction and live reinsertion of a plug from an end port of a tee fitting that is connected to discharge piping of said meter, wherein said means provides for extraction and removal of said plug from said apparatus;
    b) means for containing the flow of gas from said end port during and after extraction of said plug;
    c) means for controllably supplying gas from an alternate source through said end port to said meter discharge piping after removal of said plug from said apparatus; and
    d) means for sealing off the flow of gas from said meter so that the meter can be de-pressurized and then serviced or removed and replaced and for restoring the flow of gas from the meter or its replacement meter after the meter has been serviced or replaced.

4. Apparatus as claimed in claim 3 further comprising means for purging impure gas from said apparatus.

5. Apparatus for live bypass of a gas meter comprising:
    a) securing means for removably securing said apparatus to a tee fitting that is connected to a discharge pipe of said gas meter;
    b) sealing means for sealing against the front end of an end port of said tee having a plug inserted therein;

c) isolating means for atmospherically isolating said end port and said plug, for accommodating the insertion and retraction of a means for the extraction and re-insertion of said plug and the insertion and retraction of a means for providing alternative source gas to said tee and for sealing off the flow of gas from said meter;

d) extraction means for extracting and reinserting said plug from said end port, wherein said means provides for extraction and removal of said plug from said apparatus;

e) isolation supply means for supplying gas from an alternate gas source to said tee fitting after removal of said plug from said apparatus and for sealing off the flow of gas from said meter so that it can be depressurized and serviced or replaced.

6. Apparatus as claimed in claim 5 further comprising means for purging impure gas from said apparatus.

7. Apparatus for live bypass of a gas meter comprising:

a) clamp assembly for removably securing said apparatus to an end port of a tee fitting containing a plug, said tee fitting being connected to discharge piping of said meter;

b) isolation valve for controlling the flow of gas from said end port and for providing alternatively for the insertion of a plug extraction rod and an isolation rod;

c) seal fitting for connecting said isolation valve to said clamp assembly and sealing said apparatus to the front end of said end port;

d) plug extraction rod;

e) extraction fitting connecting to said isolation valve and providing for the insertion and extraction of said plug extraction rod, for the containment of gas from said end port when said isolation valve is open for the insertion and retraction of the plug extraction rod through said isolation valve, and for removal of an extracted plug from said apparatus;

f) isolation rod;

g) isolation fitting connecting to said isolation valve and providing for the insertion and retraction of said isolation rod and for the containment of gas from said end port when said isolation valve is open for the insertion and retraction of the isolation rod through said isolation valve.

h) means for connecting said isolation rod to an alternate gas source after removal of said extracted plug from said apparatus.

8. Apparatus as claimed in claim 7 further comprising an extractor cap affixed to the front end of said extraction fitting for use in purging said apparatus and controlling gas leakage from the extraction fitting through the annular space around the plug extraction rod in the extraction rod shaft way of said extraction fitting.

9. Apparatus as claimed in claim 7 further comprising an isolation seal fitting and an isolation seal gasket affixed to the front end of the isolation fitting for use in purging said apparatus and controlling gas leakage from the isolation fitting through the annular space between the isolation rod and the isolation fitting.

10. Apparatus as claimed in claim 7 wherein said clamp assembly comprises:

a) front clamp plate, b) plurality of clamp bolts, c) rear clamp plate, d) clamp latch, and e) one or more latch bolts.

11. Apparatus as claimed in claim 10 wherein said front clamp plate has an internally threaded opening for mating with said seal fitting.

12. Apparatus as claimed in claim 7 wherein said isolation rod comprises:

a) hollow isolation rod shaft; and b) seal tip.

13. Apparatus as claimed in claim 12 wherein said seal tip comprises:

a) seal tip pipe connected to the rear end of said isolation rod; and b) seal tip gasket.

14. Apparatus as claimed in claim 12 wherein the rear end of said isolation rod is internally threaded and has a front seal tip groove, a rear seal tip groove, one or more isolation rod ports, and one or more isolation rod plugs, and said seal tip comprises a front seal tip snap ring, a rear seal tip snap ring, a seal tip washer and a seal tip gasket.

15. Method for supplying gas from an alternate source to a tee fitting that is connected to gas meter discharge piping in a user service line and sealing off the flow of gas from said meter during service or replacement of said meter comprising the steps of:

a) extracting a plug from an end port of said tee fitting and removing said plug from said tee fitting, while continuing the flow of gas from said meter in said meter discharge piping;

b) containing the flow of gas from said end port during and after extraction of said plug;

c) controllably supplying gas from an alternate source through said end port after removal of said plug from said tee fitting;

d) sealing off the flow of gas from said meter so that said meter can be de-pressurized and then serviced or removed and replaced;

e) restoring the flow of gas from said meter or its replacement meter after said meter has been serviced or replaced;

f) terminating the flow of gas from said alternate source; and g) reinserting said plug into said tee fitting while continuing the flow of gas from said meter.

16. Method as claimed in claim 15 further comprising a step of purging impure gas to prevent introduction of impure gas into said user service line.

17. Apparatus for live bypass of a gas meter comprising:

a) clamp assembly removably securing said apparatus to an end port of a tee fitting containing a plug in discharge piping of said meter;

b) seal fitting connecting to said clamp assembly and sealing said apparatus to the front end of said end port;

c) isolation valve connecting to the front end of said seal fitting, controlling the flow of gas from said end port and providing alternatively for the insertion of a plug extraction rod and an isolation rod;

d) plug extraction rod;

e) extraction fitting connecting to said isolation valve and providing for the insertion and extraction of said plug extraction rod, for the containment of gas from said end port when said isolation valve is open for the insertion and retraction of the plug extraction rod through said isolation valve, and for the removal of an extracted plug from said apparatus;

f) isolation rod;

g) isolation fitting connecting to said isolation valve and providing for the insertion and retraction of said isolation rod and for the containment of gas from said end port when said isolation valve is open for the insertion and retraction of the isolation rod through said isolation valve;

h) means for connecting said isolation rod to an alternate gas source after removal of said extracted plug from said apparatus.

18. Apparatus as claimed in claim 17 further comprising an extractor cap affixed to the front end of said extraction fitting for use in purging said apparatus and controlling gas leakage from the extraction fitting through the annular space around the plug extraction rod in the extraction rod shaft way of said extraction fitting.

19. Apparatus as claimed in claim 17 further comprising an isolation seal fitting and an isolation seal gasket affixed to the front end of the isolation fitting for use in purging said apparatus and controlling gas leakage from the isolation fitting through the annular space between the isolation rod and the isolation fitting.

20. Apparatus as claimed in claim 17 wherein said clamp assembly comprises:

a) front clamp plate, b) plurality of clamp bolts, c) rear clamp plate, d) clamp latch, and e) one or more latch bolts.

21. Apparatus as claimed in claim 20 wherein said front clamp plate has an internally threaded opening for mating with said seal fitting.

22. Apparatus as claimed in claim 17 wherein said isolation rod comprises:

a) hollow isolation rod shaft; and b) seal tip.

23. Apparatus as claimed in claim 22 wherein said seal tip comprises:

a) seal tip pipe connected to the rear end of said isolation rod; and b) seal tip gasket.

24. Apparatus as claimed in claim 22 wherein the rear end of said isolation rod is internally threaded and has a front seal tip groove, a rear seal tip groove, one or more isolation rod ports, and one or more isolation rod plugs, and said seal tip comprises a front seal tip snap ring, a rear seal tip snap ring, a seal tip washer and a seal tip gasket.

* * * * *

UNITED STATES PATENT AND TRADEMARK OFFICE
CERTIFICATE OF CORRECTION

PATENT NO. : 5,934,304
DATED : August 10, 1999
INVENTOR(S) : Peterson et al.

It is certified that error appears in the above-identified patent and that said Letters Patent is hereby corrected as shown below:

Column 12, claim 1, lines 31-39, should read as follows: means for controllably supplying gas from an alternate source through said end port to said meter discharge piping after removal of said plug from said apparatus, for containment of the flow of gas from said end port, for sealing off the flow of gas from said meter so that the meter can be depressurized and then serviced or removed and replaced, and for restoring the flow of gas from the meter or its replacement meter after the meter has been serviced or replaced.

Signed and Sealed this

Ninth Day of January, 2001

Attest:

Q. TODD DICKINSON

*Attesting Officer*  *Commissioner of Patents and Trademarks*